United States Patent
Schroter et al.

(10) Patent No.: US 7,500,320 B2
(45) Date of Patent: Mar. 10, 2009

(54) POSITION MEASURING ARRANGEMENT AND PROCEDURE FOR THE ASSEMBLY OF A POSITION MEASURING ARRANGEMENT

(75) Inventors: Andreas Schroter, Traunstein (DE); Thomas Jäger, Trostberg (DE); Waltraud Aichhorn, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 11/881,904

(22) Filed: Jul. 30, 2007

(65) Prior Publication Data

US 2008/0028629 A1 Feb. 7, 2008

(30) Foreign Application Priority Data

Aug. 5, 2006 (DE) .................. 10 2006 036 746

(51) Int. Cl.
*G01B 21/24* (2006.01)
(52) U.S. Cl. .............................. 33/613; 33/706; 33/1 PT
(58) Field of Classification Search ................... 33/613, 33/645, 706, 707, 708, 1 PT; 250/231.13–203.18
See application file for complete search history.

(56) References Cited

U.S. PATENT DOCUMENTS

| | | | |
|---|---|---|---|
| 4,794,250 A | 12/1988 | Togami | |
| 4,942,295 A | 7/1990 | Brunner et al. | |
| 5,086,641 A * | 2/1992 | Roselli | 250/231.18 |
| 6,452,160 B1 | 9/2002 | Mitterreiter | |
| 6,660,998 B1 * | 12/2003 | Braun | 250/231.13 |
| 6,668,464 B2 * | 12/2003 | Mitterreiter et al. | 33/1 PT |
| 2003/0182809 A1 * | 10/2003 | Enzinna | 33/1 PT |
| 2004/0045182 A1 * | 3/2004 | Freitag et al. | 33/706 |
| 2007/0157477 A1 * | 7/2007 | Sellien | 33/1 PT |

FOREIGN PATENT DOCUMENTS

EP    0 353 395 B1   6/1993
EP    0 973 014 B1   4/2004

* cited by examiner

*Primary Examiner*—G. Bradley Bennett
(74) *Attorney, Agent, or Firm*—Brinks Hofer Gilson & Lione

(57) ABSTRACT

A method for assembling a position measuring arrangement for measuring a relative position of a first object with respect to a second object, wherein the position measuring arrangement includes a first unit movable in relation to a second unit of the position measuring arrangement, the method including fastening said first unit to the first object and fastening the second unit to the second object. The method further including adjusting a required scanning distance (A) between a scanning element of the second unit and a graduation of the second unit by applying a gauge to a first limit stop face of the first unit, as well as to a second limit stop face of the second unit. Prior to the fastening the first unit and the fastening second unit, positioning and fixing either the first limit stop face on the first unit or the second limit stop face on the second unit in a direction of the required scanning distance so that the scanning distance (A) is optimally adjusted.

9 Claims, 4 Drawing Sheets

POSITION MEASURING ARRANGEMENT AND PROCEDURE FOR THE ASSEMBLY OF A POSITION MEASURING ARRANGEMENT

Applicants claim, under 35 U.S.C. § 119, the benefit of priority of the filing date of Aug. 5, 2006 of a German patent application, copy attached, Serial Number 10 2006 036 746.4, filed on the aforementioned date, the entire contents of which is incorporated herein by reference.

BACKGROUND OF THE INVENTION

1. Field of the Invention

The present invention relates to a position measuring arrangement for measuring the relative position of a first object with respect to a second object, and also to a method for assembling a position measuring arrangement for measuring the relative position of a first object with respect to a second object.

2. Discussion of Related Art

Position measuring arrangements in the form of angle and linear measuring arrangements are widely employed in the machine tool industry and in other production, handling and testing systems. For reasons of space, so-called modular measuring arrangements are often employed, whose graduation support and scanning devices are delivered as separate elements, and the exact assignment of these two elements relative to each other takes place only when they are installed in the objects to be measured. Angle measuring arrangements constructed in this manner are also called built-in angle encoders, which do not have their own bearing.

In the course of position measuring, the graduation of the graduation support is scanned in a contactless manner by a scanning element of the scanning device, and position-dependent scanning signals are obtained. The size and quality of the scanning signals depends on the scanning distance, for which reason it is necessary to mount the graduation support during installation at an optimal distance from the scanning element of the scanning device.

Such a position measuring arrangement is known from EP 0 353 395 B1 in the form of an angle-measuring arrangement, as well as such a method for assembling the angle-measuring arrangement. To make installation on the objects to be measured easier, the position assignment between the graduation support and the scanning device which is required for operations, has already been fixed by the manufacturer of the angle-measuring arrangement by the provision of grooves. These grooves are used for the mutual alignment of the graduation support and the scanning device by means of an alignment element.

In U.S. Pat. No. 4,794,250, the entire contents of which are incorporated herein by reference, the alignment element is a housing part, which can be rotated around the axis of the angle-measuring arrangement which, for setting the scanning distance, is inserted between a limit stop of the scanning device active in the direction of the scanning distance and a limit stop of the graduation support active in the direction of the scanning distance. After setting and installing the components of graduation support and scanning device on the objects to be measured, the alignment element is removed from the limit stop of the graduation support by rotating it.

In this case it is disadvantageous that the position of the limit stops must be preset by highly accurate processing. Therefore very close tolerances must be observed, which makes manufacturing expensive.

To solve this problem it had already been proposed in EP 0 973 014 B1 to produce the positive connection required for providing the scanning distance by crowding the scanning device or the graduation support. It is disadvantageous here, that the material must be specially designed for this.

OBJECTS AND SUMMARY OF THE INVENTION

It is therefore an object of the present invention to disclose a position measuring arrangement for which the optimal scanning distance can be fixed in a simple manner.

This object is attained by a position measuring arrangement for measuring the relative position of a first object with respect to a second object, the position measuring arrangement including a first unit having a graduation support and fastened on the first object and a second unit having a scanning element for scanning a graduation of the graduation support at a preset scanning distance (A), wherein the second unit is fastened on the second object. The position measuring arrangement further including an alignment element placed between a first limit stop face of the first unit and a second limit stop face of the second unit, wherein the alignment element fixes a position relationship between the scanning element and the graduation support in a direction of the preset scanning distance (A) for mounting on the first object and the second object to be measured. Either the first limit stop face or the second limit stop face is defined by a positionable limit stop element, wherein the limit stop element is positioned in the direction of the scanning distance (A) and is fixed on either the first unit, if the first limit stop face is defined by the positionable limit stop element, or the second unit, if the second limit stop face is defined by the positionable limit stop element, after positioning.

This position measuring arrangement is used for measuring the relative position of a first object in regard to a second object and has a first unit which can be fastened on the first object and has a graduation support with a graduation, as well as a second unit which can be fastened on the second object and has a scanning element for scanning the graduation of the graduation support at a preset scanning distance. An alignment element is provided, which can be placed between a limit stop face of the first unit and a limit stop face of the second unit, by which the position relationship between the scanning element and the graduation support in the direction of the scanning distance is fixed for mounting on the objects to be measured. The limit stop face of the first unit is constituted by a limit stop element which is seated on the first unit and can be positioned in the direction of the scanning distance and can be fixed in place on it after positioning has been completed. Alternatively, the limit stop face of the second unit is constituted by a limit stop element which is seated on the second unit and can be positioned in the direction of the scanning distance and can be fixed in place on it after positioning has been completed. In this case the scanning distance extends in a direction perpendicularly in relation to the measuring direction of the position measuring arrangement, or in the direction of the vertical line of the graduation surface.

The advantage of the position measuring arranged in accordance with the present invention lies in that the optimal scanning distance can be individually preset in a simple manner in the course of the manufacture of the position measuring arrangement.

A further object of the present invention is to disclose a method for assembling a position measuring arrangement which makes a simple and exact setting of the scanning distance possible.

This object is attained by a method for assembling a position measuring arrangement for measuring a relative position of a first object with respect to a second object, wherein the position measuring arrangement includes a first unit movable in relation to a second unit of the position measuring arrangement, the method including fastening said first unit to the first object and fastening the second unit to the second object. The method further including adjusting a required scanning distance (A) between a scanning element of the second unit and a graduation of the second unit by applying a gauge to a first limit stop face of the first unit, as well as to a second limit stop face of the second unit. Prior to the fastening the first unit and the fastening the second unit, positioning and fixing either the first limit stop face on the first unit or the second limit stop face on the second unit in a direction of the required scanning distance so that the scanning distance (A) is optimally adjusted.

In order to be able in the course of mounting to set a first unit of the position measuring arrangement on a first object to be measured at an optimal scanning distance in regard to a second unit of the position measuring arrangement, pre-assembly is provided prior to the actual mounting. In the course of this, prior to the fastening of the first unit and the second unit, a limit stop face of a limit stop element is positioned in the direction of the scanning distance on the respective unit with an optimally set scanning distance and is fixed in place on it. Thereafter, the fastening of the first unit of the position-measuring arrangement on the first object, and the fastening of the second unit of the position measuring arrangement, which can be moved in relation to the first unit, on the position measuring arrangement takes place, wherein the required scanning distance between a scanning element of the second unit and the graduation of the first object is set by applying a gauge to a limit stop face of the first unit, as well as to a limit stop face of the second unit.

The present invention will be explained by the drawing figures by the example of an angle-measuring arrangement. However, the present invention can also be employed in connection with linear-measuring arrangements for adjusting the scanning distance of a linear graduation support relative to a scanning element of a scanning device.

Further advantages, as well as details of the present invention, ensue from the following description of an exemplary embodiment by the attached drawings.

DETAILED DESCRIPTION OF THE PREFERRED EMBODIMENTS

Figure 1:
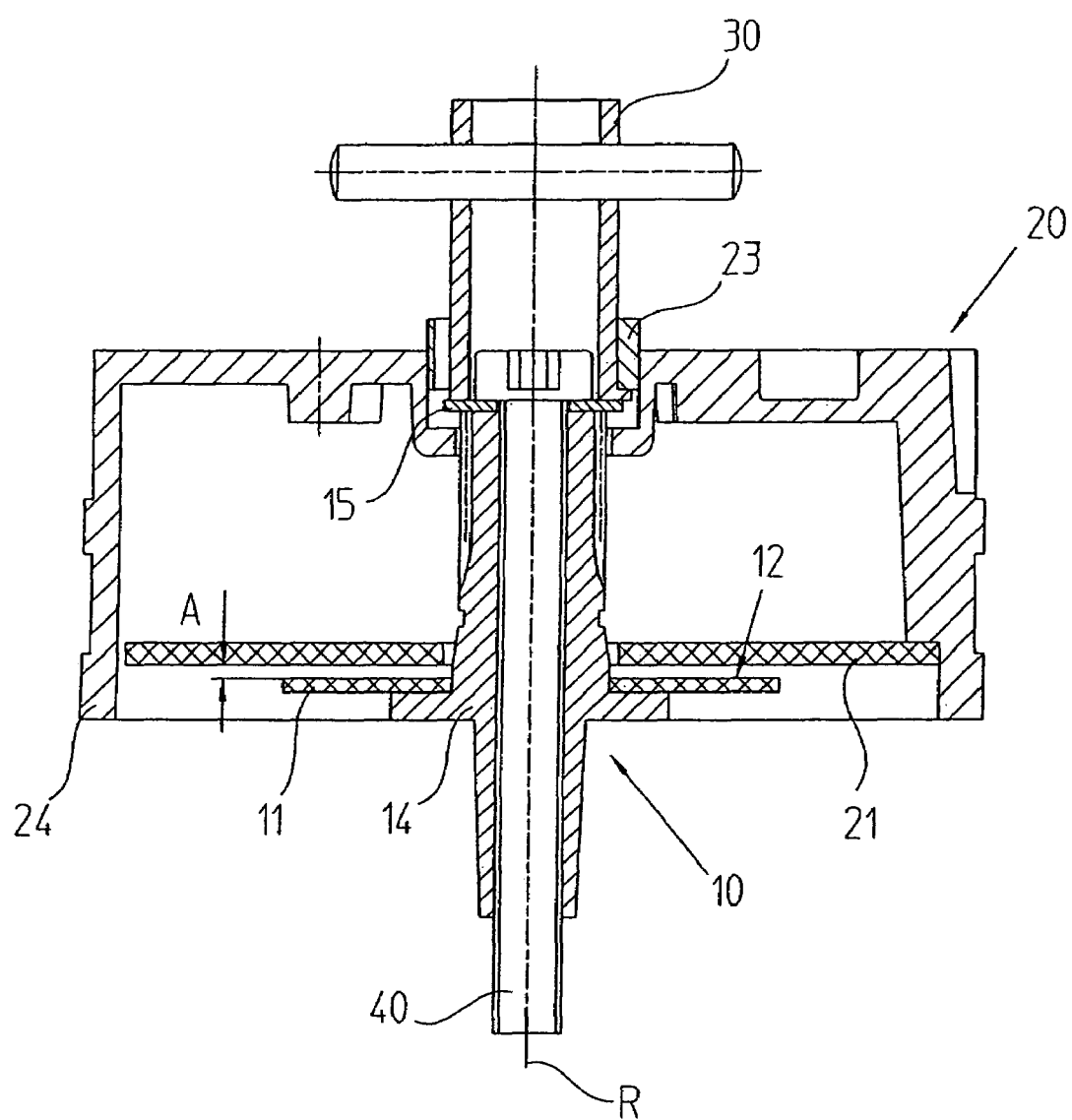
FIG. 1 is a sectional view through an embodiment of an angle-measuring attachment during the pre-assembly of an embodiment of a limit stop element by an embodiment of an alignment element in accordance with the present invention.

The pre-assembly of the angle-measuring arrangement is represented in FIG. 1. In this case the angle-measuring arrangement includes two units 10, 20, which can be rotated with respect to each for angle measuring, namely the rotor unit 10 and the stator unit 20. The rotor unit 10 contains a shaft 14 with a graduation support 11, which has a graduation 12. The stator unit 20 contains a housing 24 with a scanning element 21 fastened thereto.

Figure 2:
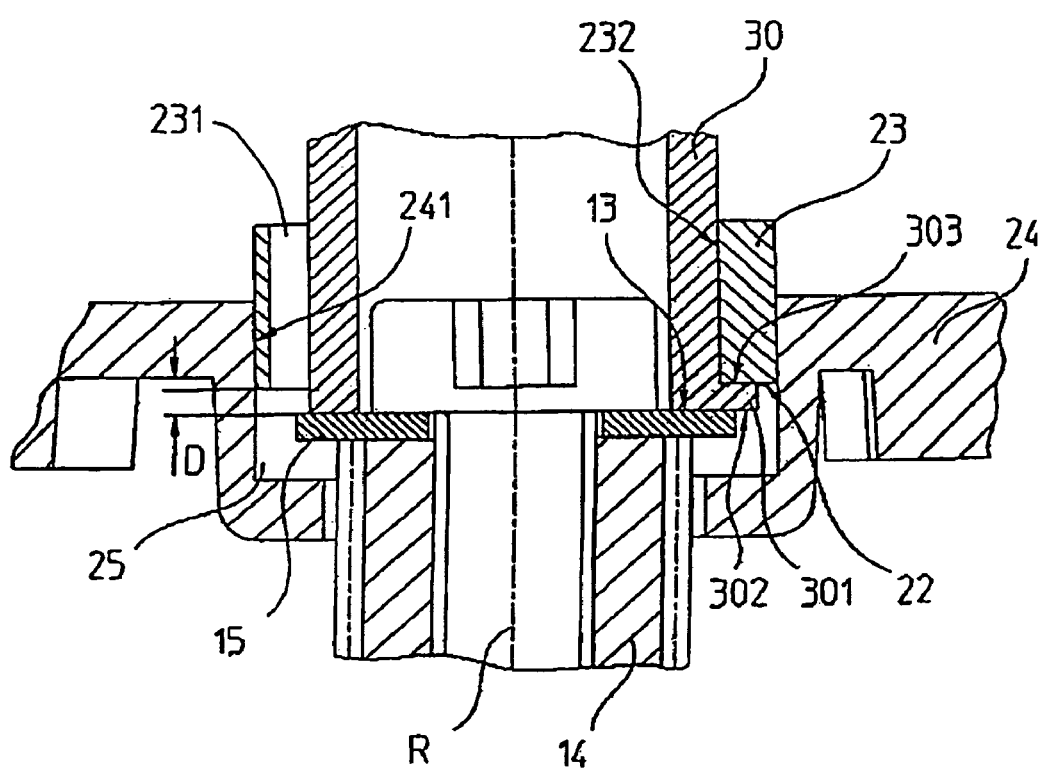
FIG. 2 is a section from FIG. 1 represented in enlargement.
Figure 4:
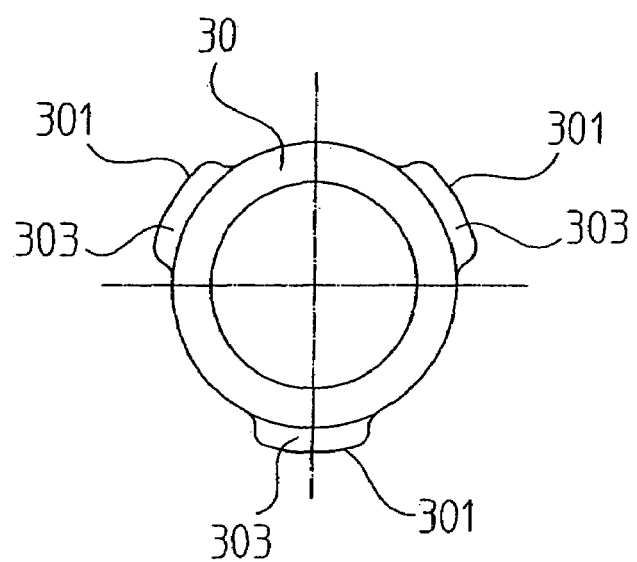
FIG. 4 is a plan view of the alignment element of FIG. 1.

By the pre-assembly, an optimally positioned limit stop face 22 of the stator unit 20 is made available to the user as shown in FIGS. 1, 2 and 4. A sleeve-shaped limit stop element 23 with a limit stop face 22 active in the direction of the scanning distance A is seated on the housing 24 and can be positioned in the direction of the scanning distance A, i.e. axially.

The two units 10, 20 are adjusted with respect to each other by a device, not represented, and with the aid of the scanning signals from the scanning element 21, in the course of which an individual, optimal scanning distance A occurs. In order to make it possible for the user to transfer this optimal assignment between the graduation support 11 and the scanning element during the installation on the objects to be measured, the limit stop face 22 of the limit stop element 23 is brought in this adjusted state into a defined distance D (see FIG. 2) with respect to an axially active limit stop face 13 of the rotor unit 10 and is fixed in place. This distance D need not agree with the scanning distance A. It is merely needed to assure that the distance D is sufficiently great so that during measuring operations a relative rotation between the rotor unit 10 and the stator unit 20 is not hampered, and that this distance D can be reproducibly set by a gauge 30 in the course of installing the rotor unit 10 on the first object 1 and the stator unit 20 on the second object 2.

Thus, the limit stop face 22 of the second unit 20 is constituted/defined by the limit stop element 23, and the limit stop face 13 of the first unit 10 is defined by a disk 15 assigned to the shaft 14. The two limit stop faces 13, 22 face each other spaced apart in the direction of the distance D.

Positioning of the limit stop element 23 in the optimally set state of the scanning distance A takes place by axially shifting the sleeve-shaped limit stop element 23 in a bore 25 of the housing 24. In this case, an alignment element 30 is inserted between the two limit stop faces 13 and 22, and the limit stop element 23 is rigidly connected in this state with the housing, for example by gluing. The wall of the bore 25 functions as a guide face 241 for axially guiding the limit stop element 23. The positionable limit stop element 23 is positionable on the guide face 241 of the housing 24 as the second unit in the direction of the scanning distance A. After positioning the limit stop element 23 on the guide face 241, the limit stop element 23 is glued to this face 241.

Figure 3:
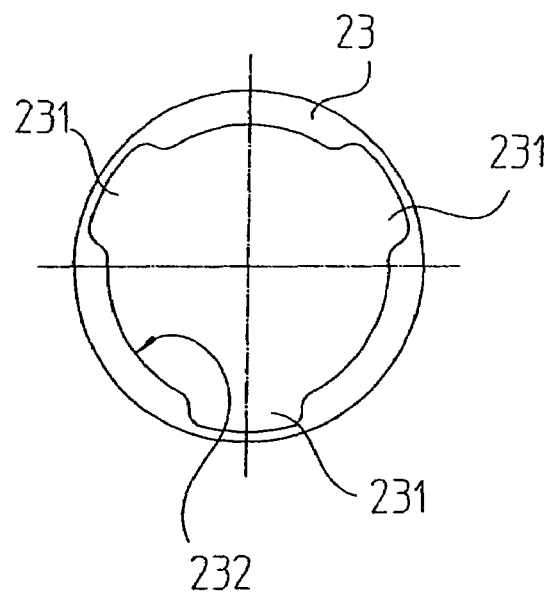
FIG. 3 is a view of the limit stop element of FIG. 1.

A view from above on the sleeve-shaped limit stop element is represented in FIG. 3, while FIG. 4 shows a view from above on the alignment element 30. In order to be able to set the distance D, possibly at limit stop faces 13, 22 located directly opposite each other, in the shortest way, and to design the alignment element 30 so it can be manipulated by the user, the alignment element 30 is designed to be sleeve- or rod-shaped, so that it can be axially passed through the sleeve-shaped limit stop element 23 and placed on the limit stop face 13. In the course of this insertion, the inner surface of the limit stop element 23 is used as a linear guide 232 for the alignment element 30 in order to avoid tilting. On its lower end, the alignment element 30 has radially outward pointing protrusions 301 of the required axial thickness D corresponding to the distance between the limit stop faces 13, 22. As shown in FIGS. 2 and 3, the limit stop element 23 has corresponding axially extending recesses 231 in order to make possible the introduction of the alignment element 30 in a first angled position into the limit stop element 23. After this introduction of the alignment element 30 through the stop element 23, the alignment element 30 can be turned, so that the radially outward pointing protrusions 301 contact the axially active limit stop face 303. In this first angled position, the protrusions 301 of the alignment element 30 are located in the recesses 231. If the alignment element 30 comes into contact with the limit stop face 13, the alignment element 30 is turned around the axis R into a second angled position, in which the protrusions 301 come to rest between the limit stop face 22 of the limit stop element 23 and the limit stop face 13 of the rotor unit 10. In this position the axially active limit stop faces 13 and 22 are brought into contact with axially active limit stop faces 302 and 303 of the alignment element 30 and in this position, as well as in the optimally adjusted position at the scanning distance A, the limit stop element 23 is rigidly fixed in place on the housing 24 of the stator unit 20 by gluing.

In a non-represented manner the limit stop face 13 of the rotor unit 10 can be alternatively embodied as a limit stop element, which can be positioned.

Following this adjustment, performed by the manufacturer of the angle-measuring arrangement, of the scanning distance A, which is individually tailored to each single angle-measuring direction by positioning the limit stop faces 13, 23 with respect to each other, an angle-measuring arrangement capable of being installed is available to the user. In order to reestablish the individually tailored scanning distance A when installing the rotor unit 10 on the first object 1 and the stator unit 20 on the second object 2 it is only required to arrange the two limit stop faces 13, 22 at the distance 22 during installation. The alignment element 30 can be used as the gauge for this during installation, as represented in FIG. 5, or another gauge, which sets the distance D.

Figure 5:
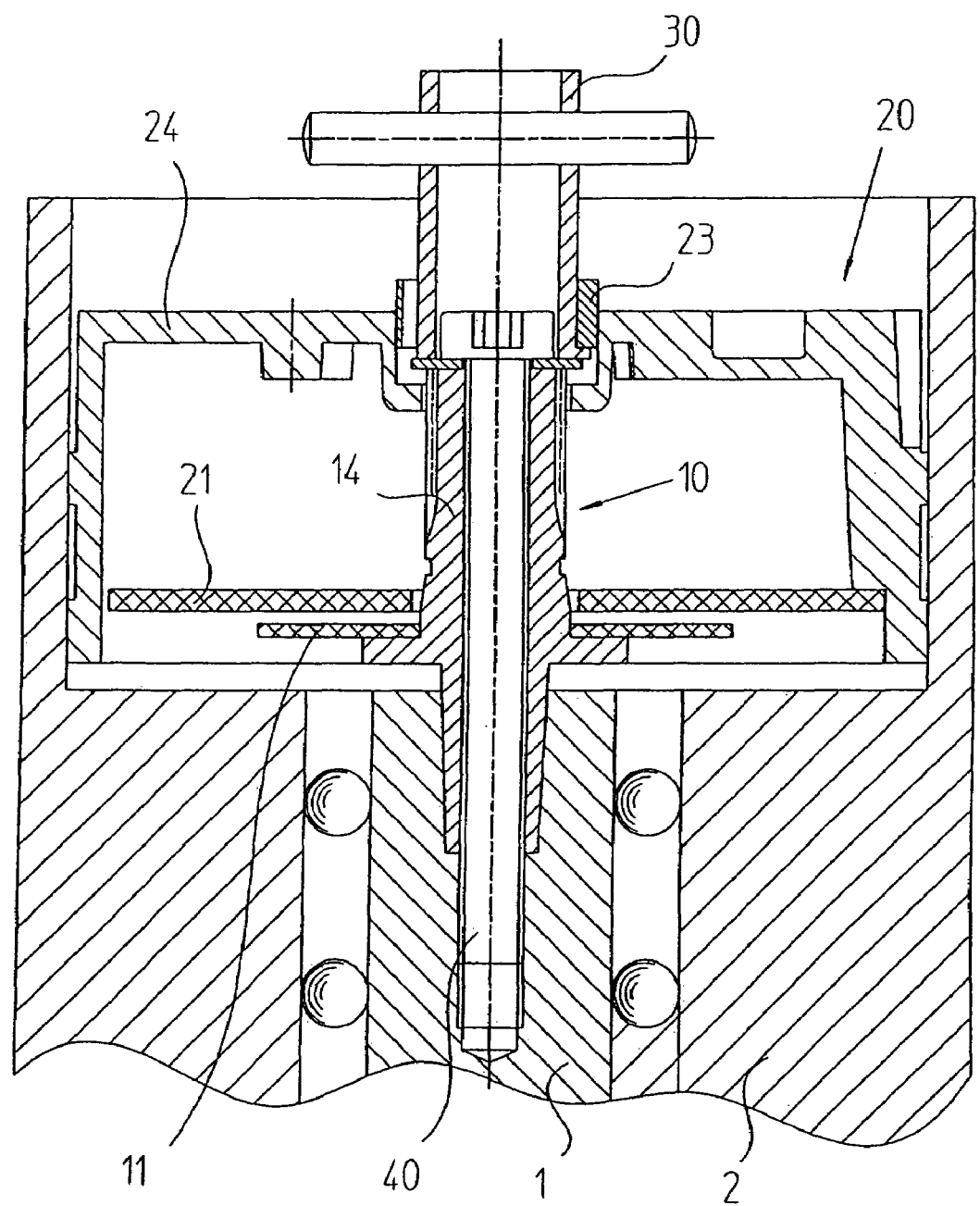
FIG. 5 shows the angle-measuring attachment of FIG. 1 while being installed on the objects to be measured.

In the example in accordance with FIG. 5, the object 1 is a motor shaft, the second object 2 a motor housing, in which the motor shaft 1 is rotatably seated. The installation, fixed against relative rotation, of the second unit 20 on the motor housing 2 is performed by radially clamping the housing 24 inside a barrel of the motor housing 2, and the installation, fixed against relative rotation, of the first unit 10 on the motor shaft 1 by the axial connection by means of a screw 40.

In the described example, scanning of the graduation 12 takes place in accordance with the inductive principle, in this case the scanning element 21 is embodied as a plate, to the surface of which excitation and sensor windings have been attached. The graduation support 11 includes a non-conducting material, and an incremental graduation 12 includes electrically-conductive areas which are spaced apart from each other has been applied to a surface.

In place of the plate it is possible to use other inductive, or also magnetically-sensitive, capacitive or light-sensitive scanning elements, in which case the graduation should be designed in accordance with the desired scanning principle. In the case of photoelectric position measuring arrangements, the scanning element can also only be a scanning plate (slit diaphragm), known per se, or a semiconductor substrate with several light-sensitive areas.

The foregoing description is provided to illustrate the present invention, and is not to be construed as a limitation. Numerous additions, substitutions and other changes can be made to the present invention without departing from its scope as set forth in the appended claims.

We claim:

1. A position measuring arrangement for measuring the relative position of a first object with respect to a second object, the position measuring arrangement comprising:
   a first unit comprising a graduation support and fastened on said first object;
   a second unit comprising a scanning element for scanning a graduation of said graduation support at a preset scanning distance (A), wherein said second unit is fastened on said second object;
   an alignment element placed between a first limit stop face of said first unit and a second limit stop face of said second unit, wherein said alignment element fixes a position relationship between said scanning element and said graduation support in a direction of said preset scanning distance (A) for mounting on said first object and said second object to be measured, wherein either said first limit stop face or said second limit stop face is defined by a positionable limit stop element, and wherein said limit stop element is positioned in said direction of said scanning distance (A) and is fixed on either said first unit, if said first limit stop face is defined by said positionable limit stop element, or said second unit, if said second limit stop face is defined by said positionable limit stop element, after positioning.

2. The position measuring arrangement in accordance with claim 1, wherein said second limit stop face is defined by said positionable limit stop element, which is positionable on a guide face of said second unit in said direction of said scanning distance.

3. The position measuring arrangement in accordance with claim 2, wherein said guide face is a wall of an opening in a housing of said second unit.

4. The position measuring arrangement in accordance with claim 2, wherein after having been positioned on said guide face, said limit stop element is glued to said guide face.

5. The position measuring arrangement in accordance with claim 3, wherein after having been positioned on said guide face, said limit stop element is glued to said guide face.

6. The position measuring arrangement in accordance with claim 2, wherein said second unit comprises a linear guide extending in said direction of said scanning distance (A), against which said alignment element is placed for being guided in a direction toward said first limit stop face.

7. The position measuring arrangement in accordance with claim 6, wherein said alignment element and said linear guide are designed in such a way that said linear guide fixes said alignment element in place in a first angled position until it contacts said first limit stop face, and said alignment element can then be brought into a second angled position, in which it additionally contacts said second limit stop face, which is distanced from said first unit.

8. The position measuring arrangement in accordance with claim 6, wherein said linear guide is an opening of said limit stop element extending in said direction of said scanning distance (A).

9. A method for assembling a position measuring arrangement for measuring a relative position of a first object with respect to a second object, wherein said position measuring arrangement comprises a first unit movable in relation to a second unit of said position measuring arrangement, the method comprising:
   fastening said first unit to said first object;
   fastening said second unit to said second object;
   adjusting a required scanning distance (A) between a scanning element of said second unit and a graduation of said second unit by applying a gauge to a first limit stop face of said first unit, as well as to a second limit stop face of said second unit; and
   prior to said fastening said first unit and said fastening said second unit, positioning and fixing either said first limit stop face on said first unit or said second limit stop face on said second unit in a direction of said required scanning distance so that said scanning distance (A) is optimally adjusted.

* * * * *